United States Patent
Wickramanayake et al.

[11] Patent Number: 5,226,957
[45] Date of Patent: Jul. 13, 1993

[54] SOLUBILIZATION OF WATER-INSOLUBLE DYES VIA MICROEMULSIONS FOR BLEEDLESS, NON-THREADING, HIGH PRINT QUALITY INKS FOR THERMAL INK-JET PRINTERS

[75] Inventors: Palitha Wickramanayake; John R. Moffatt, both of Corvallis, Oreg.

[73] Assignee: Hewlett-Packard Company, Palo Alto, Calif.

[21] Appl. No.: 853,471

[22] Filed: Mar. 17, 1992

[51] Int. Cl.$^5$ .................. C09D 11/14; C09D 11/02
[52] U.S. Cl. .................. 106/25 R; 106/22 E; 106/22 F; 106/24 R; 106/26 R; 106/32
[58] Field of Search .............. 106/22 E, 22 F, 24 R, 106/25 R, 26 R, 32

[56] References Cited

U.S. PATENT DOCUMENTS

| | | | |
|---|---|---|---|
| 3,246,997 | 4/1966 | Sumner et al. | 106/24 R |
| 4,509,982 | 4/1985 | Iijima | 106/25 R |
| 4,692,188 | 9/1987 | Ober et al. | 106/23 R |
| 4,981,517 | 1/1991 | DeSanto, Jr. et al. | 106/32 |
| 5,047,084 | 9/1991 | Miller et al. | 106/27 R |
| 5,133,803 | 7/1992 | Moffatt | 106/25 R |

Primary Examiner—Mark L. Bell
Assistant Examiner—Helene Klemanski

[57] ABSTRACT

Water-insoluble dyes are formulated in a microemulsion-based ink, which have true waterfastness, are non-threading, and are bleed-alleviated. The ink-jet inks have a formula comprising: (a) about 0.05 to 0.75 wt % of a high molecular weight colloid; (b) about 0.1 to 40 wt % of at least two surfactants, comprising at least one surfactant and at least one co-surfactant; (c) about 0.5 to 20 wt % of at least one co-solvent; (d) about 0.1 to 5 wt % of at least one water-insoluble dye; (e) about 0.1 to 20 wt % of an oil; and (f) the balance water. The inks of the invention form a stable microemulsion, which results in bleed alleviation, excellent line definition without threading, and excellent print quality.

30 Claims, No Drawings

SOLUBILIZATION OF WATER-INSOLUBLE DYES VIA MICROEMULSIONS FOR BLEEDLESS, NON-THREADING, HIGH PRINT QUALITY INKS FOR THERMAL INK-JET PRINTERS

TECHNICAL FIELD

The present invention relates generally to ink compositions and processes for making the same for use in ink-jet printers, and, more specifically, to the use of water-insoluble dyes in aqueous ink formulations for thermal ink-jet printers.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current-carrying signals cause one or more selected elements to heat up. The heating creates a bubble in the chamber, which expels ink through the nozzle toward the print medium. In this way, firing of a plurality of such resistor elements in a particular order in a given primitive forms alphanumeric characters, performs area-fill, and provides other print capabilities on the medium.

Many inks that are described for use in ink-jet printing are usually associated with non-thermal ink-jet printing. An example of such non-thermal ink-jet printing is piezoelectric ink-jet printing, which employs a piezoelectric element to expel droplets of ink onto the print medium. Inks suitably employed in such non-thermal applications often cannot be used in thermal ink-jet printing, due to the effects of heating on the ink composition.

Colored inks made using heavy dye loads, when printed on bond paper, tend to bleed and give reduced waterfastness. Bleed, as used herein, is the invasion of one color into another color on paper, which is a surface phenomenon. This is in contradistinction to uses of the term in the prior art, which tend to define "bleed" in the context of ink of a single color following the fibers of the paper; this is a sub-surface phenomenon, and is called "feathering" or "threading" herein. Waterfastness, as used herein, refers to resistance to washing out with water after printing on paper.

Surfactants have been used as anti-clogging agents in Japanese Laid-Open Patent Application No. 63-165465 for use in ink-jet recording inks. The surfactants used in that application are limited to those having a surface tension between 20 and 50 dyne/cm. The amount of surfactant ranges from about 0.5 to 25 wt %. Specific examples disclosed include sodium dodecyl benzene sulfonate, sodium laurate, and polyethylene glycol monooleyl ether.

Japanese Laid-Open Patent Application No. 01-203,483 is directed to ink-jet recording compositions. Bleed reduction is mentioned in connection with printing using the inks. The compositions also require pectin (0.01 to 2 wt %), which is probably being used as a thickener. However, pectin is not useful in inks used in thermal ink-jet printers, due to its thermal instability (it gels at higher temperatures).

Japanese Patent JO 1215-875-A is directed to inks suitable for ink-jet printing, evidencing good recording with fast drying without bleeding. The compositions all require triglycerides. Such compounds, however, are not stable to extended shelf life necessary for commercial ink-jet printing.

Japanese Patent JO 1230-685-A is directed to inks suitable for ink-jet printing, evidencing quick absorption on the surface of conventional office paper without smear or blotting. The compositions comprise colorants and liquid solvents and/or dispersants and are characterized by the presence of a copolymer of ethylene oxide and propylene oxide of the formula $HO(C_2H_4O)_a\text{-}C_3H_6O(C_2H_4O)_bH$, where $a+b$ is up to 50 and $b$ is optionally 0. These copolymers are referred to as "PLURONICS". For the most part, they have not been found to stop bleed or to give good print quality.

High molecular weight (>10,000) colloids, such as sodium alginate, have been used to control bleed, as disclosed and claimed in copending application Ser. No. 07/737,101, now U.S. Pat. No. 5,133,803, filed Jul. 29, 1991, and assigned to the same assignee as the present application. The high molecular weight colloids, used in conjunction with water-soluble dyes, require the presence of at least one zwitterionic surfactant and/or non-ionic amphiphile.

Good line definition has been afforded in using the following formula for thermal ink-jet inks (cyan, magenta, yellow):

- 8 wt % 1,5-pentanediol;
- 2 wt % SURFYNOL 465 (a trademark of Air Products & Chemicals, Inc.);
- 0.25 wt % sodium alginate (high molecular weight);
- 1.0 wt % N,N-dimethyl-N-(Z-9-octadecenyl)-N-amine oxide (OOAO);
- Dye, such as 0.75 wt % sodium-Acid Blue 9, 1.2 wt % sodium-Acid Red 52, or a mixture of 0.25 wt % Direct Yellow 86+0.25 wt % Acid Yellow 23; and
- the balance water.

These inks evidence alleviation of both threading and bleed between colors printed one adjacent the other. However, they are not waterfast.

To achieve waterfastness, for example, water-insoluble dyes have been used along with cyclodextrin; application Ser. No. 07/702,437, now U.S. Pat. No. 5,108,505, filed May 16, 1991, and assigned to the same assignee as the present application, discloses inks containing water-insoluble dyes and cyclodextrin. It is currently believed that the highest degree of waterfastness will come by the use of water-insoluble dyes.

Microemulsions, which may be defined as thermodynamically stable isotropic "solutions" of water, oil, surfactant, and co-surfactant, have been used to solubilize water-insoluble dyes for ink-jet printing in the past. The function of water is to provide a continuous phase for the microemulsion droplets and it facilitates the formation of microemulsion droplets by entropic means. The oil is a water-insoluble substance which resides primarily in the microemulsion droplets—the discontinuous phase. The surfactant is an amphipathic, surface active, self-aggregating species which is primarily responsible for the formation of microemulsion droplets. The co-surfactant is an amphipathic species which significantly concentrates in the microemulsion droplets and it affords stability to the droplets.

The success of microemulsion-based inks has been limited due to the extent of threading or feathering in the resulting print sample. Apparently, the combination of high organic solvent and surfactant concentrations used in these inks causes extensive wetting of the paper fibers and fillers, resulting in feathering; poor edge acuity is the end result.

Attempts have been made to overcome such print quality deficiencies by the use of microemulsion-based inks that are solids at ambient temperatures, but are liquids at elevated (e.g., 70° C.) temperatures; see, e.g., U.S. Pat. No. 5,047,084. These inks, however, place additional demands on the printhead and the printer, such as pre-heaters to keep the ink in liquid form prior to firing, and rollers to flatten the solid ink droplets (lenslets) that are formed on the print medium, thus making the product more complex and costly.

Hence, the use of completely water-insoluble dyes in liquid inks, which are completely waterfast when printed on print media, makes their use an attractive approach. Thus, a need remains for colored inks in which threading and bleed are alleviated, yet which are also waterfast and afford high print quality printing.

DISCLOSURE OF INVENTION

In accordance with the invention, water-insoluble dyes may be formulated in microemulsion-based inks, which are completely waterfast, are non-threading, and are bleed-alleviated. The ink-jet inks have a formula comprising:

(a) about 0.05 to 0.75 wt % of a high molecular weight colloid;

(b) 0.1 to 40 wt % of at least two surfactants, comprising at least one surfactant and at least one co-surfactant;

(c) about 0.5 to 20 wt % of at least one co-solvent;

(d) about 0.1 to 5 wt % of at least one water-insoluble dye;

(e) about 0.1 to 20 wt % of an oil; and (f) the balance water.

The inks of the invention, which are liquid at room temperature, form a stable microemulsion, which results in bleed alleviation, excellent line definition without threading, and excellent print quality, due to the combination of high molecular weight colloids and the microemulsion.

BEST MODES FOR CARRYING OUT THE INVENTION

In accordance with the invention, ink compositions are provided which are waterfast, bleedless, non-threading, and which evidence high print quality. The ink compositions comprise (a) about 0.05 to 0.75 wt % of a high molecular weight colloid, (b) 0.1 to 40 wt % of at least two surfactants, comprising at least one surfactant and at least one co-surfactant, (c) about 0.5 to 20 wt % of at least one co-solvent, (d) about 0.1 to 5 wt % of one or more water-insoluble dyes, (e) about 0.1 to 20 wt % of an oil, and (f) the balance water.

The inks may also include one or more biocides, fungicides, and/or slimicides (microbial agents), as is commonly practiced in the art. Microbial reagents include, but are not limited to, NUOSEPT (Nudex, Inc., a division of Huls America), UCARCIDE (Union Carbide), VANCIDE (RT Vanderbilt Co.), and PROXEL (ICI Americas).

All concentrations herein are in weight percent, unless otherwise indicated. The purity of all components is that employed in normal commercial practice for thermal ink-jet inks.

As used herein the term "high molecular weight colloid" refers to a colloid having a molecular weight of at least about 10,000.

The large polysaccharides (colloids) disclosed herein for use in thermal ink-jet printing are effective at about 0.05 to 0.75 wt % in alleviating bleed and providing excellent edge acuity. At levels much higher than this, the viscosity of the ink is too high to jet from a pen.

Apparently, these polysaccharides aggregate to form large molecular clusters, and hence, they are also commonly classified as surfactants. However, as used herein, these polysaccharides are considered apart from other surfactants mentioned, which are also included in the ink compositions.

The colloids used in the practice of the invention include colloids derived from natural sources, such as salts of alginic acid, mannomuronic acid, carrageenan (such as the hot water extract of marine algae *Chondrus crispus* or *Rhodoohvceae*), guar and xanthan gums, dextran, chitin, and chitosan. In addition, synthetic colloids, such as carboxymethylcellulose, may be employed in the practice of the invention.

The present invention preferably employs "sodium" alginate having a molecular weight of about 12,000 to 80,000 and a typical degree of polymerization range of about 60 to 400. This range provides the desired bleed control of the inks. "Sodium" alginates typically comprise 5.5% sodium, 2% calcium, and 9.5% potassium as the principal counterions, along with trace amounts of other mono- and di-valent cations.

The alginates most preferably employed in the practice of the invention are characterized by relatively low viscosity: a 1% solution in water yields a viscosity of 60 centipoise (cp), while a 2% solution in water yields a viscosity of 500 cp. Such material is commercially available from Aldrich Chemical Company (Milwaukee, Wis.).

As used herein, the term "co-solvent", which is commonly used in ink-jet technology, refers to a water-miscible solvent having a vapor pressure that is lower than that of water. Co-solvents are usually added as an aid in nozzle-clogging prevention and long-term storage of the ink. Certain co-solvents may also stabilize microemulsion droplets.

Co-solvents can include, but are not limited to, glycols such as ethylene glycol, diethylene glycol, triethylene glycol, tetraethylene glycol, propylene glycol, polyethylene glycol, polypropylene glycol, and derivatives thereof; diols such as butanediol, pentanediol, hexanediol, and homologous diols; and other solvents such as sulfolane, esters, ketones, lactones such as γ-butyrolactone, lactams such as N-pyrrolidone, 2-pyrrolidone, and N-(2-hydroxyethyl) pyrrolidone, and glycerols and their derivatives.

Preferably, the co-solvent comprises pentanediol, most preferably 1,5-pentanediol. Other organic co-solvents commonly employed in thermal ink-jet printing, such as diethylene glycol, have not been found to be as effective as pentanediol.

The concentration of the pentanediol ranges from about 4 to 15 wt %. Less than about 4% results in long term crusting of the ink at the printhead nozzles, while greater than about 15% results in an ink that is too viscous to be jetted. Preferably, the concentration of pentanediol ranges from about 5 to 9 wt %, and most preferably is about 8 wt %.

The surfactant system comprises at least two surfactants, a surfactant and a co-surfactant. The surfactant and co-surfactant have been defined above.

A preferred surfactant is an amine oxide, such as N,N-dimethyl-N-dodecyl amine oxide (NDAO):

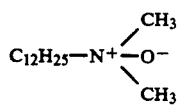

Also, in place of the $C_{12}H_{25}$- moiety, any R moiety may be used. The following moieties, their name, and abbreviation, are useful in the practice of the invention:
N,N-dimethyl-N-tetradecyl amine oxide (NTAO);
N,N-dimethyl-N-hexadecyl amine oxide (NHAO);
N,N-dimethyl-N-octadecyl amine oxide (NOAO);
N,N-dimethyl-N-(Z-9-octadecenyl)-N-amine oxide (OOAO).

Incorporation of dyes into microemulsion droplets is the probable method by which surfactant-containing inks control bleed. Microemulsion droplets with dye of one color fired from an ink-jet pen will not exchange dye of another color in an adjacent microemulsion droplet on print media, because the rate at which the mobile vehicle evaporates or adsorbs into the paper is much faster than the desorption rate of the dye molecules from the microemulsion droplets or the rate at which dye molecules diffuse among the microemulsion droplets. Bleed alleviation is the result.

Co-surfactants can include, but are not limited to, glycol esters such as propylene glycol laurate; mono and di glycol ethers, including ethylene glycol monobutyl ether, di-ethylene glycol ethers, diethylene glycol mono ethyl, butyl, hexyl ethers, propylene glycol ether, dipropylene glycol ether, and triethylene glycol ether; and long chain alcohols such as butyl alcohol, pentyl alcohol, and homologous alcohols.

Additional examples of co-surfactants suitably employed in the practice of the invention include the SURFYNOLS, which are acetylenic polyethylene oxide surfactants available from Air Products & Chemicals, Inc. The SURFYNOLS are represented as

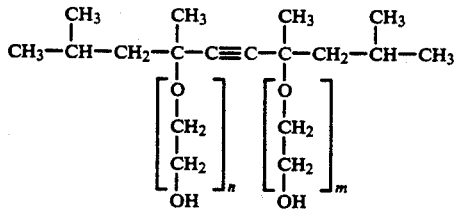

where $n+m=0$ to 50.

Alginates (and the other polysaccharides listed as well) are highly efficient at controlling bleed. Although use of surfactants such as OOAO and SURFYNOL 465 alleviate bleed over the organic co-solvent alone (such as 1,5-pentanediol and diethylene glycol), further improvement occurs upon addition of sodium alginate Large molecular weight poly-saccharides should incorporate dye molecules in their hydrophobic pockets. These large molecular complexes have small diffusion coefficients and should migrate slowing in (or on) print media. Thus, aggregating polysaccharides should enhance the bleed control afforded by smaller aggregate-forming surfactants such as OOAO and NOAO.

Water-insoluble dyes are those dyes which evidence no appreciable dissolution of dye in water at room temperature. A water-insoluble dye, as used herein, is one in which its solubility in aqueous solvent (assuming <20% organic co-solvent) is so small that its optical density on various papers is <0.80. (This definition will vary slightly among paper brands and types, but should differ no more than ±0.2.)

Water-insoluble dyes are most useful in inks in which the property of waterfastness is important, because once such inks are printed on paper, they will not smear in the presence of water. Examples of such water-insoluble dyes include solvent dyes, vat dyes, and certain mordant dyes. These dyes are available in a variety of blacks and colors.

Examples of solvent dyes include Solvent Black (SB) 3, SB 5, SB 46, Solvent Blue 36, Solvent Blue 59, Solvent Red (SR) 1, SR 24, SR 68, Solvent Yellow (SY) 13, SY 14, SY 33, and SY 93. Examples of vat dyes include Vat Black 9, Vat Black 25, Vat Blue 1, Vat Blue 6, Vat Red 10, and Vat Yellow 4. Further examples of vat dyes include a family of dyes available under the trademark known as WAXOLINE dyes; these dyes include WAXOLINE Orange EPFW 35117; WAXOLINE Red O 31833; WAXOLINE Black 5BP 35115; and WAXOLINE Black OBP 35109. (WAXOLINE is a trademark of ICI Americas.) Examples of water-insoluble mordant dyes include Mordant Black 1, Mordant Black 9, Neazopon Black X52 from BASF Corp., Chemical Division (Holland, Mich.), Mordant Blue 1, Mordant Red 7, Mordant Red 9, and Mordant Yellow 26.

Incorporating such water-insoluble dyes in an ink poses many challenges. If the dyes are soluble in an organic solvent, that solvent is likely to be toxic or may react with the printhead of the printer, causing corrosion products and the like. On the other hand, such water-insoluble dyes cannot, of course, by definition be directly incorporated in water-base inks.

In accordance with the invention, water-insoluble dyes, specifically, that class of water-insoluble vat dyes known as WAXOLINE dyes, are formulated in aqueous-based inks, employing microemulsions, together with a high molecular weight colloid.

The microemulsion is formed by the combination of the surfactant and co-surfactant described above, an oil, and water. The microemulsion keeps the water-insoluble dye in "solution". Once the ink is printed on print media, the dye, being water-insoluble, renders the image water-fast. The ink evidences no bleed between colors and no threading along the print medium fibers.

Use of the colloids described above in conjunction with the surfactants enhances the text print quality and renders the line definition sharper between colors printing adjacent one another.

The oil comprises either a water-insoluble organic solvent or a water-insoluble mono or di glycol ether. Examples of water-insoluble organic solvents (oils) include non-toxic aromatics and hydrocarbons. Examples of non-toxic aromatic compounds include toluene, xylenes, naphthalene, naphthalene sulfonates, substituted naphthalene sulfonates, phenanthrene, and anthracene.

Examples of hydrocarbons include the straight and branched hydrocarbons containing from 8 to 22 carbon atoms, inclusive (octane to isocane). Hydrocarbons containing less than about 8 carbon atoms are too volatile, and will evaporate from the ink. Hydrocarbons containing more than about 22 carbon atoms are generally not soluble in the microemulsion droplet.

Preferably, straight chain molecules and molecules having simple branching, such as primary alkanes, are employed in the practice of the invention.

Alkenes may also be employed, having up to three carbon-carbon double bonds.

The preferred inks of the invention consist essentially of about 4 to 15 wt % 1,5-pentanediol; about 0.05 to 0.75 wt % sodium alginate; 0.1 to 10 wt % of N,N-dimethyl-N-(Z-9-octadecenyl)-N-amine oxide and an acetylenic polyethylene oxide; 0.1 to 5 wt % of at least one of the water-insoluble dyes mentioned earlier; about 0.5 to 10 wt % toluene; and the balance water.

An especially preferred composition consists essentially of

8% 1,5-pentanediol;
0.25% sodium alginate;
1% N,N-dimethyl-N-(Z-9-octadecenyl)-N-amine oxide;
2% acetylenic polyethylene oxide;
1% toluene;
0.2% water-insoluble vat dye; and
the balance water.

An ink formulated with the foregoing composition exhibited total waterfastness and high print quality when printed on paper from a thermal ink-jet printer.

The inks of the invention are formulated by first combining the water-miscible components (water, co-solvent, surfactants, and high molecular weight colloid) to form a stable solution. Next, the water-insoluble dye(s) and oil are added to form a mixture. The mixture is then homogenized, such as by stirring, shaking, or other means of agitating, to form the microemulsion-based ink. Attempts to formulate the ink by merely adding all the ingredients together would take too long to form the microemulsion, since the presence of the oil would delay the solubilization of the high molecular weight colloid. It is to be noted that omission of the high molecular weight colloid would cause the ink to thread, resulting in inferior print quality.

For a certain known concentration ratio of surfactant to co-surfactant, the microemulsifiable oil content can be conveniently determined by titration: As long as the amount of oil added is microemulsifiable, a homogeneous phase would spontaneously form; as the limit is exceeded, the oil phase would separate out. By varying the surfactant to co-surfactant concentration ratio, one can readily determine the ratio that allows maximum amount of oil emulsified. Keeping the oil content below the maximum amount yields a stable microemulsion.

INDUSTRIAL APPLICABILITY

The present inks are expected to find use in thermal ink-jet printers as the next generation of waterfast inks that are bleedless, non-threading, and evidence high print quality.

Thus, waterfast thermal ink-jet inks and a method for formulating them have been disclosed. Various changes and modifications of an obvious nature may be made without departing from the spirit of the invention, and all such changes and modifications are considered to fall within the scope of the invention as defined by the appended claims.

What is claimed is:

1. A microemulsion-based thermal ink-jet ink containing a water-insoluble dye comprising:

(a) about 0.05 to 0.75 wt % of a high molecular weight colloid;
(b) about 0.1 to 40 wt % of at least two surfactants, comprising at least one surfactant and at least one co-surfactant;
(c) about 0.5 to 20 wt % of at least one co-solvent;
(d) about 0.1 to 5 wt % of at least one water-insoluble dye;
(e) about 0.1 to 20 wt % of an oil; and
(f) the balance water.

2. The thermal ink-jet ink of claim 1 wherein said high molecular weight colloid is selected from the group consisting of salts of alginic acid, mannomuronic acid, carrageenan, guar and xanthan gums, dextran, chitin, chitosan, and carboxymethylcellulose.

3. The thermal ink-jet ink of claim 2 wherein said high molecular weight colloid consists essentially of sodium alginate.

4. The thermal ink-jet ink of claim 1 wherein said at least one surfactant is an amine oxide.

5. The thermal ink-jet ink of claim 4 wherein said amine oxide is selected from the group consisting of N,N-dimethyl-N-(Z-9-octadecenyl)-N-amineoxide,N,N-dimethyl-N-dodecyl amine oxide, N,N-dimethyl-N-tetradecyl amine oxide, N,N-dimethyl-N-hexadecyl amine oxide, and N,N-dimethyl-N-octadecyl amine oxide.

6. The thermal ink-jet ink of claim 1 wherein said at least one co-surfactant is selected from the group consisting of glycol esters, mono and di glycol ethers, diethylene glycol ethers, long chain alcohols, and acetylenic polyethylene oxides.

7. The thermal ink-jet ink of claim 6 wherein said glycol ester comprises propylene glycol laurate; said mono and di glycol ethers are selected from the group consisting of ethylene glycol monobutyl ether, diethylene glycol ethers, propylene glycol ether, dipropylene glycol ether, and triethylene glycol ether; and said long chain alcohols are selected from the group consisting of butyl alcohol, pentyl alcohol, and homologous alcohols.

8. The thermal ink-jet ink of claim 1 wherein at least one co-solvent is selected from the group consisting of glycols, diols, sulfolane, esters, ketones, lactones, lactams, and glycerols and their derivatives.

9. The thermal ink-jet ink of claim 8 wherein said glycols are selected from the group consisting of ethylene glycol, diethylene glycol, triethylene glycol, tetraethylene glycol, propylene glycol, polyethylene glycol, polypropylene glycol, and derivatives thereof; said diols are selected from the group consisting of butanediol, pentanediol, hexanediol, and homologous diols; said lactone comprises γ-butyrolactone; and said lactams are selected from the group consisting of N-pyrrolidone, 2-pyrrolidone, and N-(2-hydroxyethyl) pyrrolidone.

10. The thermal ink-jet ink of claim 9 wherein said co-solvent consists essentially of about 4 to 15 wt % pentanediol.

11. The thermal ink-jet ink of claim 1 wherein said water-insoluble dye is selected from the group consisting of water-insoluble solvent dyes, vat dyes, and mordant dyes.

12. The thermal ink-jet ink of claim 1 wherein said oil is selected from the group consisting of non-toxic aromatics, straight and simple branched hydrocarbons having from about 8 to 22 carbon atoms, alkenes having up to three carbon-carbon double bonds, and mono and di glycol ethers.

13. The thermal ink-jet ink of claim 12 wherein said non-toxic aromatics are selected from the group consisting of toluene, xylenes, naphthalene, naphthalene sulfonates, substituted naphthalene sulfonates, phenanthrene, and anthracene.

14. The thermal ink-jet ink of claim 1 consisting essentially of about 4 to 15 wt % 1,5-pentanediol; about 0.05 to 0.75 wt % sodium alginate; 0.1 to 10 wt % of N,N-dimethyl-N-(Z-9-octadecenyl)-N-amine oxide and an acetylenic polyethylene oxide; said water-insoluble dye; about 0.5 to 10 wt % toluene; and the balance water.

15. The thermal ink-jet ink of claim 14 consisting essentially of
   about 8 wt % 1,5-pentanediol;
   about 0.25 wt % sodium alginate;
   about 1 wt % N,N-dimethyl-N-(Z-9-octadecenyl)-N-amine oxide;
   about 2 wt % of an acetylenic polyethylene oxide;
   about 1 wt % toluene;
   about 0.2 wt % water-insoluble vat dye; and
   the balance water.

16. A method of preparing a waterfast, microemulsion-based thermal ink-jet ink containing a water-insoluble dye comprising:
   (a) preparing a stable aqueous phase by combining the following:
      (1) about 0.05 to 0.75 wt % of a high molecular weight colloid,
      (2) about 0.1 to 40 wt % of at least two surfactants, comprising at least one surfactant and at least one co-surfactant,
      (3) about 0.5 to 20 wt % of at least one co-solvent, and
      (4) the balance water;
   (b) adding to said stable aqueous phase the following to form a mixture:
      (5) about 0.1 to 5 wt % of at least one water-insoluble dye, and
      (6) about 0.1 to 20 wt % of an oil; and
   (c) homogenizing said mixture to form a microemulsion.

17. The method of claim 16 wherein said high molecular weight colloid is selected from the group consisting of salts of alginic acid, mannomuronic acid, carrageenan, guar and xanthan gums, dextran, chitin, chitosan, and carboxymethylcellulose.

18. The method of claim 17 wherein said high molecular weight colloid consists essentially of sodium alginate.

19. The method of claim 16 wherein said at least one surfactant is an amine oxide.

20. The method of claim 19 wherein said amine oxide is selected from the group consisting of N,N-dimethyl-N-(Z-9-octadecenyl)-N-amine oxide, N,N-dimethyl-N-dodecyl amine oxide, N,N-dimethyl-N-tetradecyl amine oxide, N,N-dimethyl-N-hexadecyl amine oxide, and N,N-dimethyl-N-octadecyl amine oxide.

21. The method of claim 16 wherein said at least one co-surfactant is selected from the group consisting of glycol esters, mono and di glycol ethers, diethylene glycol ethers, long chain alcohols, and acetylenic polyethylene oxides.

22. The method of claim 21 wherein said glycol ester comprises propylene glycol laurate; said mono and di glycol ethers are selected from the group consisting of ethylene glycol monobutyl ether, diethylene glycol ethers, propylene glycol ether, dipropylene glycol ether, and triethylene glycol ether; and said long chain alcohols are selected from the group consisting of butyl alcohol, pentyl alcohol, and homologous alcohols.

23. The method of claim 16 wherein at least one co-solvent is selected from the group consisting of glycols, diols, sulfolane, esters, ketones, lactones, lactams, and glycerols and their derivatives.

24. The method of claim 23 wherein said glycols are selected from the group consisting of ethylene glycol, diethylene glycol, triethylene glycol, tetraethylene glycol, propylene glycol, polyethylene glycol, polypropylene glycol, and derivatives thereof; said diols are selected from the group consisting of butanediol, pentanediol, hexanediol, and homologous diols; said lactone comprises γ-butyrolactone; and said lactams are selected from the group consisting of N-pyrrolidone, 2-pyrrolidone, and N-(2-hydroxyethyl) pyrrolidone.

25. The method of claim 24 wherein said co-solvent consists essentially of about 4 to 15 wt % pentanediol.

26. The method of claim 16 wherein said water-insoluble dye is selected from the group consisting of water-insoluble solvent dyes, vat dyes, and mordant dyes.

27. The method of claim 16 wherein said oil is selected from the group consisting of non-toxic aromatics, straight and simple branched hydrocarbons having from about 8 to 22 carbon atoms, alkenes having up to three carbon-carbon double bonds, and mono and di glycol ethers.

28. The method of claim 27 wherein said non-toxic aromatics are selected from the group consisting of toluene, xylenes, naphthalene, naphthalene sulfonates, substituted naphthalene sulfonates, phenanthrene, and anthracene.

29. The method of claim 16 wherein said stable aqueous phase consists essentially of about 4 to 15 wt % 1,5-pentanediol; about 0.05 to 0.75 wt % sodium alginate; 0.1 to 10 wt % of N,N-dimethyl-N-(Z-9-octadecenyl)-N-amine oxide and an acetylenic polyethylene oxide; and the balance water and wherein said oil consists essentially of about 0.5 to 10 wt % toluene.

30. The method of claim 29 wherein said stable aqueous phase consists essentially of about 8 wt % 1,5-pentanediol, about 0.25 wt % sodium alginate, about 1 wt % N,N-dimethyl-N-(Z-9-octadecenyl)-N-amine oxide, about 2 wt % of an acetylenic polyethylene oxide, and the balance water; wherein said water-insoluble dye consists essentially of about 0.2 wt % of a vat dye; and wherein said oil consists essentially of about 1 wt % toluene.

* * * * *